United States Patent
Brogan et al.

(10) Patent No.: US 9,612,619 B2
(45) Date of Patent: Apr. 4, 2017

(54) ELECTRONIC DEVICE WITH PIVOTING DISPLAY ASSEMBLY

(71) Applicants: Hugh Brogan, Isle of Man (GB); George Hines, Berkhamsted (GB)

(72) Inventors: Hugh Brogan, Isle of Man (GB); George Hines, Berkhamsted (GB)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 14/982,559

(22) Filed: Dec. 29, 2015

(65) Prior Publication Data
US 2016/0132073 A1    May 12, 2016

Related U.S. Application Data

(63) Continuation of application No. 13/679,317, filed as application No. PCT/GB2011/050907 on May 11, 2011, now Pat. No. 9,250,654.

(30) Foreign Application Priority Data

May 11, 2010    (GB) .................................. 1009952.1

(51) Int. Cl.
*G06F 1/16*    (2006.01)

(52) U.S. Cl.
CPC .......... *G06F 1/1637* (2013.01); *G06F 1/1601* (2013.01); *G06F 1/1616* (2013.01);
(Continued)

(58) Field of Classification Search
None
See application file for complete search history.

(56) References Cited

U.S. PATENT DOCUMENTS

| | | | | | |
|---|---|---|---|---|---|
| 5,268,817 | A | * | 12/1993 | Miyagawa | G06F 1/1618 361/679.06 |
| 5,507,072 | A | * | 4/1996 | Youn | G06F 1/1616 16/261 |

(Continued)

FOREIGN PATENT DOCUMENTS

GB    1074524    7/1967

OTHER PUBLICATIONS

International Preliminary Report on Patentability issued in related application PCT/GB2011/050907, mailed Nov. 13, 2012, 8 pages, Nov. 13, 2012.

(Continued)

*Primary Examiner* — Courtney Smith
*Assistant Examiner* — Rashen E Morrison
(74) *Attorney, Agent, or Firm* — Baker Botts L.L.P.

(57) ABSTRACT

An electronic device includes a display assembly, in which the display assembly is positioned within a strength member frame and pivots around a pair of hinges fixed into the strength member frame, the strength member frame isolating the display assembly from forces that would otherwise damage the display assembly. The display assembly may include a rectangular display element and the strength member frame is then a rigid rectangular frame that surrounds all four sides of the display assembly, all sides of the rigid rectangular frame being capable of isolating the display assembly from forces that would otherwise damage the display assembly. The invention hence enables a computing device display to be securely held, protected and manipulated. The display is protected from stress, torsional forces, impact forces and over-rotation.

20 Claims, 20 Drawing Sheets

(52) U.S. Cl.
CPC .......... *G06F 1/1618* (2013.01); *G06F 1/1633* (2013.01); *Y10T 29/49826* (2015.01)

(56) References Cited

U.S. PATENT DOCUMENTS

| | | | | |
|---|---|---|---|---|
| 5,559,670 | A * | 9/1996 | Flint | G06F 1/162 361/679.06 |
| 5,594,619 | A * | 1/1997 | Miyagawa | G06F 1/1618 361/679.09 |
| 5,805,415 | A * | 9/1998 | Tran | G06F 1/1601 248/918 |
| 6,198,625 | B1 * | 3/2001 | Leman | G06F 1/1616 361/679.27 |
| 6,266,236 | B1 * | 7/2001 | Ku | G06F 1/162 312/223.1 |
| 6,304,431 | B1 * | 10/2001 | Kim | G06F 1/1616 361/679.09 |
| 6,653,919 | B2 * | 11/2003 | Shih-Chung | G06F 1/162 24/303 |
| 6,882,529 | B2 * | 4/2005 | Helot | G06F 1/1683 361/679.08 |
| 6,937,468 | B2 * | 8/2005 | Lin | G06F 1/1632 361/679.41 |
| 6,980,425 | B2 * | 12/2005 | Chuang | G06F 1/162 16/367 |
| 6,985,356 | B2 * | 1/2006 | Wang | G06F 1/162 248/920 |
| 7,156,351 | B2 * | 1/2007 | Wang | G06F 1/162 248/121 |
| 7,221,562 | B2 * | 5/2007 | Song | G06F 1/162 312/223.2 |
| 7,277,275 | B2 * | 10/2007 | Won | G06F 1/162 248/918 |
| 7,457,109 | B2 * | 11/2008 | Goto | G06F 1/1616 349/58 |
| 7,502,225 | B2 * | 3/2009 | Solomon | G06F 1/1632 361/679.41 |
| 7,593,524 | B2 * | 9/2009 | Maenpaa | H04M 1/0216 379/433.13 |
| 7,599,178 | B2 * | 10/2009 | Huang | G06F 1/1632 361/679.28 |
| 7,643,274 | B2 * | 1/2010 | Bekele | G06F 1/1616 206/320 |
| 7,828,616 | B2 * | 11/2010 | Kim | G02F 1/133308 361/638 |
| 7,952,858 | B2 * | 5/2011 | Lee | H04M 1/0237 16/330 |
| 7,990,693 | B2 * | 8/2011 | Nakajima | G06F 1/1616 361/679.08 |
| 8,014,140 | B2 * | 9/2011 | Kitamura | G06F 1/183 248/349.1 |
| 8,208,245 | B2 * | 6/2012 | Staats | G06F 1/162 361/679.02 |
| 8,289,685 | B2 * | 10/2012 | Li | G06F 1/1616 361/679.26 |
| 8,416,568 | B2 * | 4/2013 | Tian | G06F 1/1626 361/679.55 |
| 8,599,542 | B1 * | 12/2013 | Healey | G06F 1/1626 345/168 |
| 8,619,172 | B2 * | 12/2013 | Senatori | G06F 1/1616 348/333.01 |
| 8,749,963 | B2 * | 6/2014 | Staats | G06F 1/1632 248/121 |
| 8,817,457 | B1 * | 8/2014 | Colby | G06F 1/1669 206/320 |
| 2003/0167601 | A1 * | 9/2003 | Chen | G06F 1/162 16/367 |
| 2004/0203994 | A1 * | 10/2004 | Won | G06F 1/162 455/522 |
| 2004/0246666 | A1 * | 12/2004 | Maskatia | G06F 1/1616 361/679.57 |
| 2005/0063145 | A1 * | 3/2005 | Homer | G06F 1/162 361/679.27 |
| 2005/0099765 | A1 * | 5/2005 | Wang | G06F 1/162 361/679.06 |
| 2005/0128695 | A1 * | 6/2005 | Han | G06F 1/162 361/679.55 |
| 2005/0168925 | A1 * | 8/2005 | Fang | G06F 1/1632 361/679.07 |
| 2006/0152897 | A1 * | 7/2006 | Hirayama | G06F 1/1656 361/679.08 |
| 2007/0046635 | A1 | 3/2007 | Nishiyama | |
| 2009/0316355 | A1 * | 12/2009 | Jones | G06F 1/1632 361/679.55 |
| 2010/0064475 | A1 * | 3/2010 | Wang | G06F 1/1616 16/232 |
| 2010/0238620 | A1 * | 9/2010 | Fish | G06F 1/1616 361/679.09 |
| 2011/0199726 | A1 * | 8/2011 | Moser | G06F 1/1654 361/679.09 |
| 2011/0292584 | A1 * | 12/2011 | Hung | G06F 1/1632 361/679.26 |
| 2012/0080577 | A1 * | 4/2012 | McIntyre | F16M 11/041 248/346.04 |
| 2012/0106078 | A1 * | 5/2012 | Probst | G06F 1/1616 361/679.56 |
| 2012/0111881 | A1 * | 5/2012 | Gaddis, II | H05K 5/023 220/752 |
| 2012/0170212 | A1 * | 7/2012 | Gallouzi | F16M 11/041 361/679.56 |
| 2012/0243149 | A1 * | 9/2012 | Gartrell | G06F 1/1616 361/679.01 |
| 2013/0033807 | A1 * | 2/2013 | Kim | G06F 1/1669 361/679.01 |
| 2013/0147716 | A1 * | 6/2013 | Hawker | G06F 1/1632 345/168 |
| 2013/0170126 | A1 * | 7/2013 | Lee | G06F 1/1654 361/679.17 |
| 2013/0176674 | A1 * | 7/2013 | Brogan | G06F 1/1601 361/679.27 |
| 2013/0279100 | A1 * | 10/2013 | Fontana | G06F 1/1632 361/679.2 |
| 2013/0322011 | A1 * | 12/2013 | Yeh | G06F 1/181 361/679.44 |
| 2014/0029185 | A1 * | 1/2014 | Leong | G06F 1/1626 361/679.08 |
| 2014/0063714 | A1 * | 3/2014 | Chung | G06F 1/162 361/679.09 |
| 2014/0133080 | A1 * | 5/2014 | Hwang | G06F 1/1632 361/679.17 |
| 2014/0153182 | A1 * | 6/2014 | North | G06F 1/1632 361/679.41 |

OTHER PUBLICATIONS

International Search Report and Written Opinion issued in related application PCT/GB2011/050907, mailed Aug. 8, 2011, 10 pages, Aug. 8, 2011.

* cited by examiner

Screws in horizontal plane

ELECTRONIC DEVICE WITH PIVOTING DISPLAY ASSEMBLY

CROSS-REFERENCE TO RELATED APPLICATION

This application is a continuation of application Ser. No. 13/697,317 titled "Electronic Device with Pivoting Display Assembly," filed Mar. 28, 2013, which is a national application of PCT/GB2011/050907 filed May 11, 2011, which claims priority to GB1009952.1 filed May 11, 2010, now abandoned, the contents of which are incorporated herein by reference in their entirety.

BACKGROUND OF THE INVENTION

1. Field of the Invention

This invention relates to an electronic device with a pivoting display assembly. The invention is especially applicable to the emerging category of convertible computers which are distinguished by their ability to be transformed from a laptop notebook-style to a tablet-style computing device form factor, usually by means of physically manipulating the display on one hand to face toward a keyboard and on the other hand to face away from a keyboard.

The invention includes a flexible architecture for computing devices displays which enables realisation of a plurality of different computing device models, sizes and form factors using common or similar subsystems, layout schemes, components, and/or designs thereof. The invention further enables common or similar manufacturing methods; assembly and test methods; processes; and/or apparatuses. Aspects of the invention may be applicable to other types of computing device in addition to convertible computers, which may include but are not limited to laptop/notebook computers, netbook computers, tablet computers, and/or all-in-one (in which the computing engine and display are placed together within the same case, such as with the Apple iMac) or desktop computers. The invention may be further applicable to certain form factors of mobile telephones, portable media players, satellite navigation devices, or similar devices, or to devices with the appearance of any of these or of other computing or electronic devices.

The invention addresses especially the problem of torsional and other mechanical forces to which a moveable display may be subject to during manipulation. The invention also addresses the problem of cable fixation and routing and also the problem of where and how to mount mechanical, electromechanical and electronic components that may be required to be mounted in a portable computing device or a device with appearance of a portable computing device. The invention further addresses other common problems arising in the design and manufacture of the display part of a computing device, especially convertible computing devices, which include restrictions on size, thickness and weight; time to market reduction; quality and reliability; and logistical and manufacturing complexity.

Convertible computers in general and this invention in particular enable a number of additional usage models beyond a standard laptop usage model where a computing device keyboard part and a computing device display part are connected by a hinge or hinges, forming a clamshell which may be open to give access to the keyboard and sight of the display, for example at an obtuse angle. Examples of additional usage models enabled by this invention include but are not limited to:

Tablet-style, where the clamshell is closed with the display part is facing outward relative to the keyboard part. (See FIG. 1 and FIG. 2)

Media-viewing-style, where the clamshell is open at an acute angle with the display past facing outward relative to the keyboard part, and both parts rest on a surface on their non-hinged edges, forming an inverted V. (See FIG. 3)

Presentation-style, where the device is placed similarly as in media-viewing style, with the intention of showing a presentation to another person. (see FIG. 4) In variations of this usage model, the display part and keyboard part might be oriented in opposite directions to one another, either with the hinged edge resting on the surface or the opposite, non-hinged edges resting on the surface. In that way, the keyboard and other user interface elements on the keyboard part are made accessible to the presenter. In a further variation, the keyboard part might also include a secondary display, allowing both the presenter and the viewer to see what is being shown.

2. Description of the Prior Art

Several computing device trends drive the need for an invention such as this:

With the rise in popularity of tablet computers, their limitations—especially the lack of a hard keyboard (i.e., not a software-generated keyboard shown on the display)—are becoming more apparent. Convertible computers offer a "best of both worlds" alternative to both typical tablets and typical laptops.

Vendors are expected to field an ever wider variety of device types and models, and to get those devices to market more quickly than in the past. Display variations, especially variations in size, are a common method of differentiating device models.

Smaller size and weight—and especially thinness—are becoming prerequisites at most device price tiers as opposed to just at the highest design or luxury tiers.

The competitive imperative to offer devices with increasing capabilities, such as sensors, cameras, antennas and touchscreens, increases design and manufacturing complexity, and puts further pressure on size and weight goals. These issues are especially troublesome in the upper part (higher tier) of a laptop/notebook-style computing device design, as the display and the structure, and cables needed to support it, already account for such a large proportion of the available space.

In the emerging market for convertible computers, there are two mainstream methods employed to construct clamshell computing devices with a display which is able to be positioned such that it faces away from the keyboard and, typically, may be closed over and thus cover the keyboard.

The most common method in currently shipping convertible devices is to employ a single hinge mechanism between the base and the upper part of the device that not only bends backward and forward as does the hinge in a typical laptop but which is also mounted on an rotational element or includes a rotational element within it that allows the display part to be swivelled at least 180° relative to the keyboard. The hinge is commonly placed in the center rear of the device base but may instead be placed at one of the rear corners.

Examples of products employing such a method include laptops such as the Fujitsu Lifebook U820, the HP Touchsmart tm2, and the Asus Eee PC T91. This method is also used in non-laptop electronic products such as the Xtrons P1201 portable DVD player.

A much less common method of producing convertible laptop computers is to allow the display to pivot at its vertical center between two hinged arms or within an outer frame. Prior art exists for various implementations of a laptop-style computing device with an upper part that include a rotatable display held between arms or within a frame. See for example U.S. Pat. Nos. 5,410,447, 6,005,767 and 6,266,236.

At the time of filing, the inventors are aware only of the Vadem Clio and the similar Sharp Tripad which were commercialized using this basic concept. Neither has been shipping for several years. Both the Clio and the Tripad feature two separate arms holding the display rather than a surrounding frame.

The mainstream prior art solutions suffer from a number of weaknesses:

Display panels may be exposed to potentially damaging torsional and other mechanical forces due to inadequate protection against bending and flexing. This requires the thickness of the display housing to increase and also to increase the thickness of the glass used in the display as these both must be able to withstand the forces being applied to manipulate the display. The combination of these produces a thicker device which is not as portable and hence not as commercially attractive.

Potentially damaging impact forces may be transferred to the display panel from surrounding mechanics if the device is dropped.

Mechanisms to prevent over-rotation of the display may be prone to physical wear and tear which could impact reliability.

Existing methods of routing cabling through hinges may be bulky, difficult to assemble and prone to field failure.

Existing methods of routing cabling often direct signal and power cables through the same channel, exposing signal cabling to electromagnetic interference, which may require either processing or further electronics to remove In pivoting implementations, the two sides of the display may not be synchronized, resulting in the two sides of the display rotating at different rates and twisting horizontally in relationship to the device base, inducing potentially damaging stresses into the display.

Mechanical mechanisms to manage movement of and to provide protection to the display may leave little room for additional components such as cameras, microphones or antennas, limiting design freedom and flexibility whilst at the same time increasing design complexity, manufacturing complexity and costs.

Existing convertible computer implementations require new and complex hinge designs increasing design complexity and cost.

SUMMARY OF THE INVENTION

A first aspect of the invention is an electronic device including a display assembly, in which the display assembly is positioned within a strength member frame and pivots around a pair of hinges fixed into the strength member frame, the strength member frame isolating the display assembly from forces that would otherwise damage the display assembly.

The display assembly may (i.e. optionally) include a rectangular display element and the strength member frame is then a rigid rectangular frame that surrounds all four sides of the display assembly, all sides of the rigid rectangular frame being capable of isolating the display assembly from forces that would otherwise damage the display assembly.

The invention hence enables a computing device display to be securely held, protected and manipulated. The display is protected from stress, torsional forces, impact forces and over-rotation.

Further optional features of the invention include the following:

The display may be manipulated such that its orientation relative to a computing device base is reversed, or to an intermediate position, making the invention especially relevant to the emerging category of convertible computers. Convertible computers are distinguished by their ability to be transformed from a laptop/notebook-style to a tablet-style computing device form factor, usually by means of physically manipulating the display on one hand to face toward a keyboard and on the other hand to face away from a keyboard.

The invention covers a flexible architecture for computing devices displays which enables realisation of a plurality of different computing device models, sizes and form factors using common or similar subsystems, layout schemes, components, and/or designs thereof. The invention further enables common or similar manufacturing methods; assembly and test methods; processes; and/or apparatuses. Aspects of the invention may be applicable to other types of computing device in addition to convertible computers, which may include but are not limited to laptop/notebook computers, netbook computers, tablet computers, and/or all-in-one (in which the computing engine and display are placed together within the same case, such as with the Apple iMac) or desktop computers. The invention may be further applicable to certain form factors of mobile telephones, portable media players, satellite navigation devices, or similar devices, or to devices with the appearance of any of these or of other computing or electronic devices.

The invention addresses especially the problem of torsional and other mechanical forces to which a moveable display may be subject to during manipulation. An implementation of the invention also addresses the problem of cable fixation and routing and also the problem of where and how to mount mechanical, electromechanical and electronic components that may be required to be mounted in a portable computing device or a device with appearance of a portable computing device. An implementation of the invention further addresses other common problems arising in the design and manufacture of the display part of a computing device, especially convertible computing devices, which include restrictions on size, thickness and weight; time to market reduction; quality and reliability; and logistical and manufacturing complexity.

Implementations of the invention address weaknesses in the prior art in five main areas:

1. Fixing, securing and protection of the display in such a way as to enable multi-directional physical manipulation while guarding against the transfer of potentially damaging forces to the display panel during manipulation or on impact, via means of a strength member cover, strength member frame, and related elements. The movements required to convert the computing device from a laptop-style to a tablet-style computing device are distributed across two sets of simple hinges rather than using very complex hinge designs as with much of the prior art.

a. A display support frame is secured to the display element, and then a display rear cover is secured to the display support frame creating a 'unibody-type' construction. This assembly is mounted via two vertically centered secondary barrel hinge assemblies into a strength member frame, which contains a plurality of barrel hinge mountings.

The location of the barrel hinges and the barrel hinge mountings may be reversed by placing the barrel hinge mounting into the display assembly and the barrel hinge into the strength member frame.

b. The strength member frame and or the strength member cover are themselves mounted via standard primary laptop hinges to a computing device base.

c. The display assembly may be pivoted by means of the secondary barrel hinges within the strength member frame to face either toward or away from a keyboard, for example, on a computing device base.

d. The display, strength member cover and strength member frame assembly may also be closed on top of the computing device base by means of the primary standard laptop hinges with the display panel facing either inward toward the computing device base or outward away from the computing device base.

e. The strength member frame is a rigid frame with a 'C' or 'I' cross-section.

f. Each of the four sides of the strength member frame is designed to take the torsional load that would otherwise damage the display assembly (which includes the glass (typically) LCD panel 2. Component mounting positions—The strength member cover and or the strength member frame provide mounting positions for additional components such as speakers, cameras, antennas, buttons, sensors, etc.

a. In various embodiments, mounting positions are placed in either or both of the strength member cover and strength member frame.

b. Either or both of the strength member cover and the strength member frame may also act as cosmetic covers for the various components.

3. Resistance to stress by means of 'unibody-type' assembly construction—The various mechanical components are assembled in such a way as to work as a unibody system when stressed, for example during physical manipulation of a rotating display from one position to another.

a. The display element is screwed to the display support frame which is in turn secured to the display rear cover which is formed of a rigid material, creating a unibody construction.

b. The hinge barrels are mounted along the side edge of the display rear case by means of screws or other means in the horizontal plane to the display support frame and to the display rear case, maximizing engagement. Alternatively, screws or other fixation methods could be employed in vertical or other implementations.

c. Hinge barrels may also be located by pins to provide for further bonding among the system elements.

d. A protective sleeve may be used, but is not required, between the two sides of the barrel hinge to act as a spacer and to provide protection between the two side of the hinge.

e. The strength member frame and the strength member cover are assembled in such a way as to form a unibody assembly. The assembly is secured with screws (or other means). Alternatively, screws or other fixation methods could be employed in vertical or other implementations. These are attached in a horizontal plane to maximise the strength of the assembly. This configuration distributes the forces acting upon the frame during manipulation and/or when it is mechanically shocked through the strength member frame and the strength member frame cover and away from the display assembly.

4. Cable routing—The strength member cover, strength member frame and hinges also provide for means of cable routing.

a. Cable routing options are flexible in order to accommodate many possible embodiments of signal and power cable routing, as well auxiliary components (e.g., speaker, camera, sensor) positioning within the strength member cover, strength member frame or on/within any other element of the display and torsion frame assembly. The combined display and torsion frame assembly is also referred to as the "display part" of a laptop clamshell, i.e. the companion to the keyboard part of the laptop clamshell.

b. Signal and power cables may be routed through separate hinges, both between the device base assembly, and between the strength member frame assembly and the strength member cover assembly, and the display assembly.

c. Cables are routed through hinge bores using various methods which minimize circular diameter through the bores and flat thickness on each side of the bores.

d. Hinge bore designs may be such that cables may be inserted pre-assembled during manufacture, rather than inserted and then assembled (e.g., by adding a connector or connectors), as with the prior art. For example, the barrel hinge design may include, but is not required to have, a shaped channel to allow cables to be placed through the hinge bore pre-assembled.

e. The optional protective sleeve in the hinge may, but is not required to, provide additional strength to the hinge and include another shaped channel for cable insertion that is then moved out of alignment with the shaped channel on the barrel hinge, thus guarding against the cable slipping out of the assembly.

5. Display locating—Locating of the display during rotation and protection against over-rotation is provided for by means of several possible methods.

a. Either the strength member frame or strength member cover may provide for mounting locations for securing of the display in a conventional laptop-style configuration, a tablet-style configuration, or any other pre-determined or optionally user selectable configuration.

b. Locating may be by means of spring assemblies, magnets, pins, friction fit or other methods. One or more locating method may be used concurrently in a given embodiment.

Other aspects of the invention include the following:

An electronic device including (i) a base and (ii) a rigid rectangular frame hinged to the base and (iii) a display assembly that can rotate within the rigid rectangular frame, the frame fully surrounding the sides of the display assembly and each side of the frame being designed to isolate the display assembly from forces that would otherwise damage the display assembly.

An electronic device including (i) a base and (ii) a rigid rectangular frame hinged to the base and (iii) a display assembly that can rotate within the rigid rectangular frame, the display assembly including a display panel fixed using screws to a rigid display support frame, at least some of the screws being aligned parallel to the axis of rotation of the display assembly.

An electronic device including (i) a base and (ii) a rigid strength member frame hinged to the base and (iii) a display assembly that can rotate within the rigid strength member frame, and in which the strength member frame is constructed as a 'unibody-type' construction.

An electronic device including (i) a base, (ii) a rigid strength member frame and (iii) a rigid strength member cover hinged to the base and (iv) a display assembly that can rotate within the rigid strength member frame, and in which the strength member frame and strength member frame cover are constructed as a 'unibody-type' construction.

An electronic device including (i) a base and (ii) a rigid strength member frame hinged to the base, (iii) a display assembly that can rotate within the rigid strength member frame, and (iv) a cover for the strength member frame; in which the strength member frame cover is constructed as a 'unibody-type' construction.

An electronic device including (i) a base and (ii) a rigid rectangular frame hinged to the base and (iii) a display assembly that can rotate within the rigid rectangular frame, the frame or the display assembly including location and locking elements that to prevent over-rotation. Any or all of the hinge barrels, hinge barrel mounts and hinge barrel sleeves contain details that locate and secure the display assembly in various orientations.

An electronic device including (i) a base and (ii) a rigid frame hinged to the base; (iii) a display assembly that can rotate within the rigid frame on two hollow hinges and (iv) cables that run from the base to the rigid frame; in which the cables are split into two bundles, with one bundle running through one primary hinge into the rigid frame and the other bundle running through the other primary hinge into rigid frame, with each bundle then routed through a hollow hinge assembly located within the rigid frame.

BRIEF DESCRIPTION OF THE DRAWINGS

An implementation of the invention will be described with reference to the accompanying drawings.

DETAILED DESCRIPTION

An implementation of the invention will described in reference to the included drawings.

Display Fixation and Movement

A computing device display is fixed, secured and protected in such a way as to enable multi-directional physical manipulation while guarding against the transfer of potentially damaging forces to the display panel during manipulation or on impact, via means of a strength member cover, strength member frame, and related elements. The movements required to convert the computing device from a laptop-style to a tablet-style computing device are distributed across two sets of simple hinges rather than using very complex hinge designs as with much of the prior art.

Figure 9:
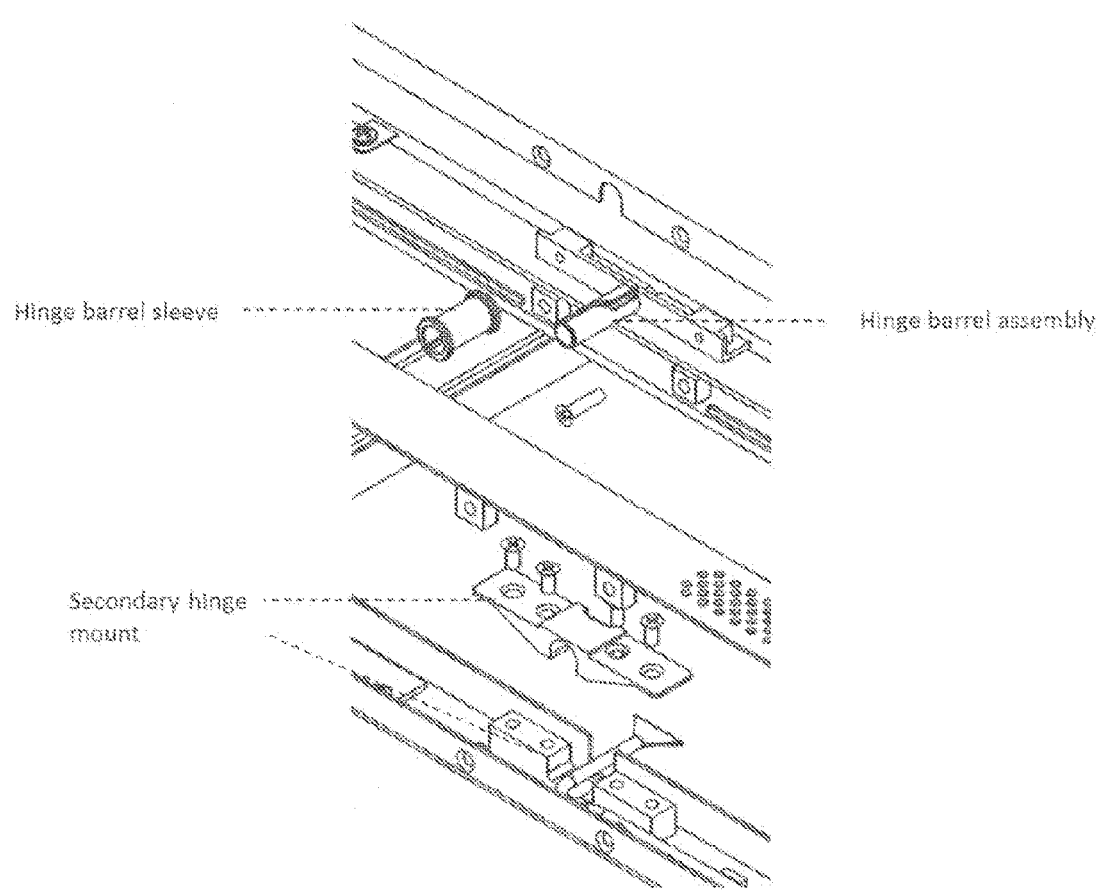
Figure 13:
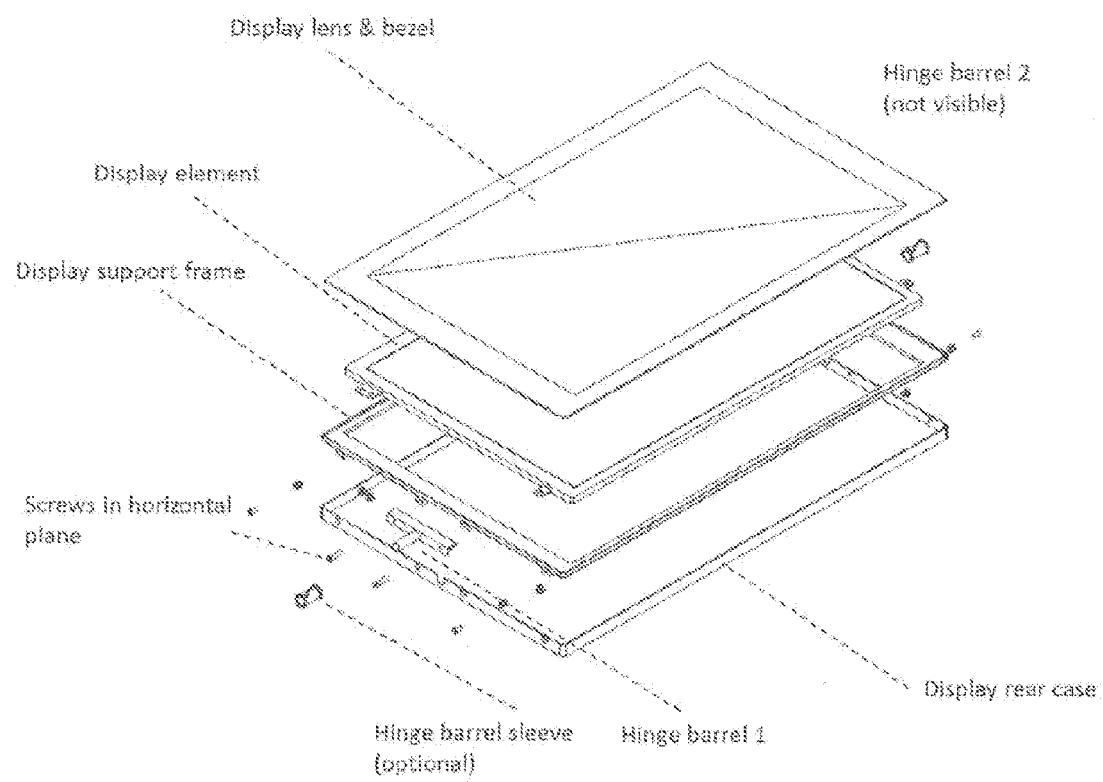
Figure 15:
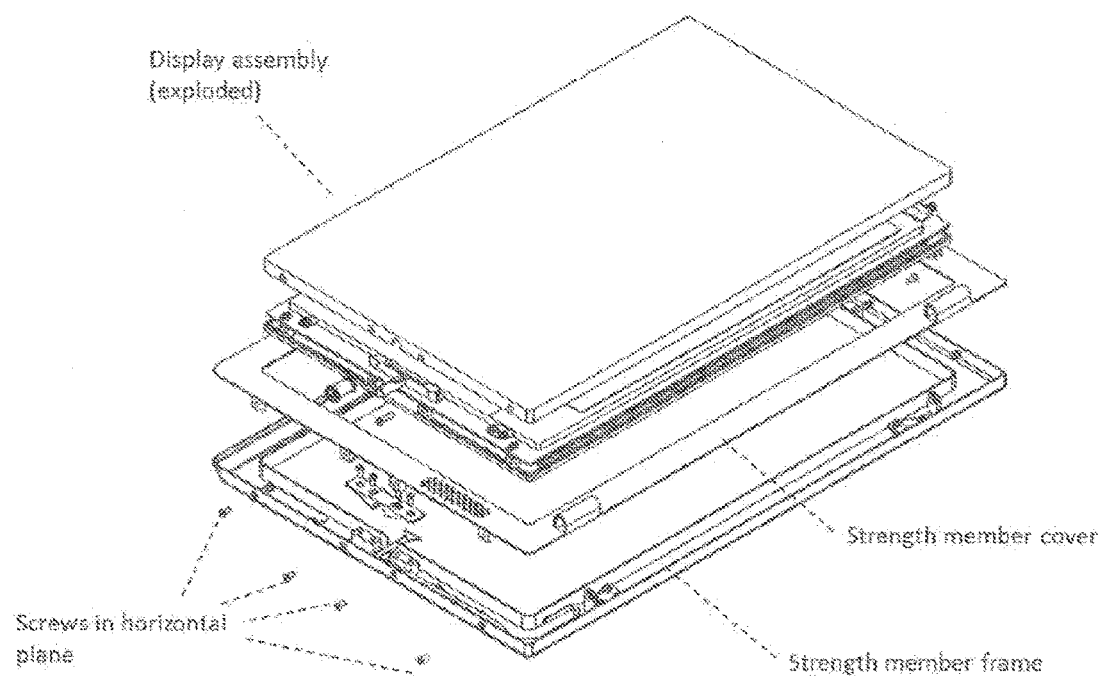

A display support frame is secured to the display element, and then a display rear cover is secured to the display support frame creating a unibody construction. (See FIG. 13). This assembly is mounted via two vertically centered secondary barrel hinge assemblies (See FIG. 9) into a strength member frame, which contains a plurality of barrel hinge mountings. (See FIG. 15) The location of the barrel hinges and the barrel hinge mountings may be reversed by placing the barrel hinge mounting into the display assembly and the barrel hinge into the strength member frame.

Figure 8:
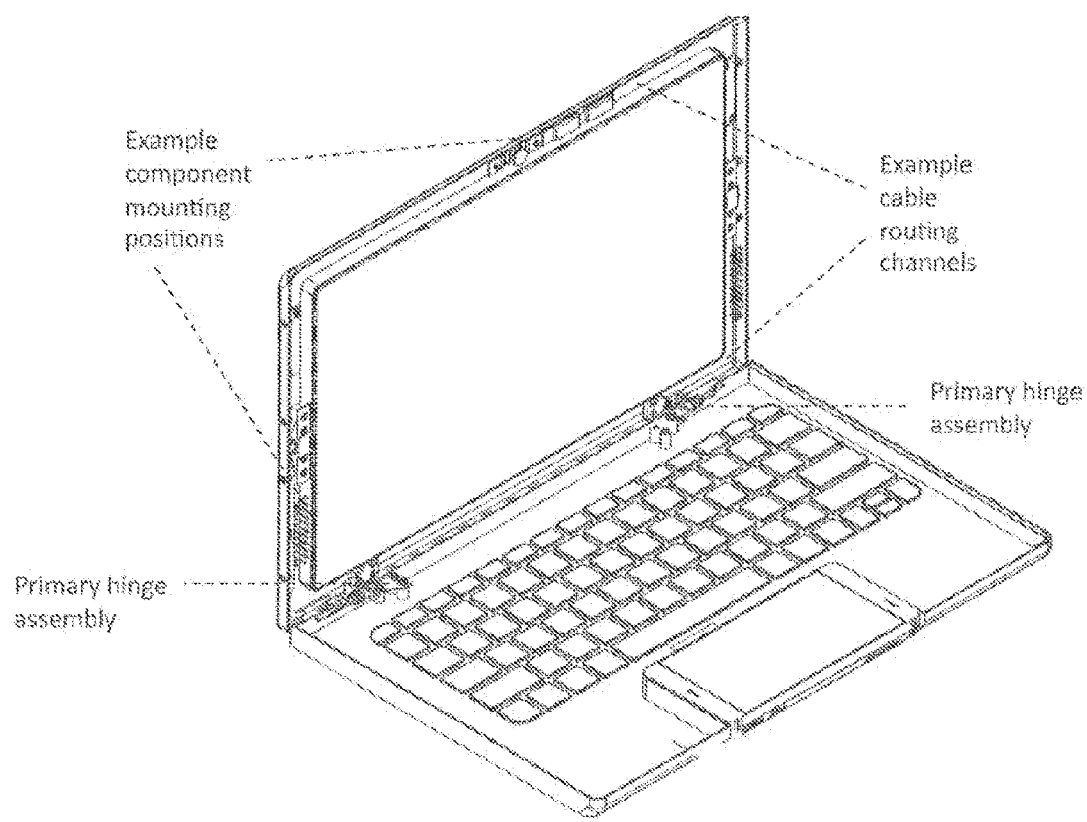

The strength member frame and or the strength member cover are themselves mounted via primary standard laptop hinges to a computing device base. (See FIG. 8)

Figure 5:
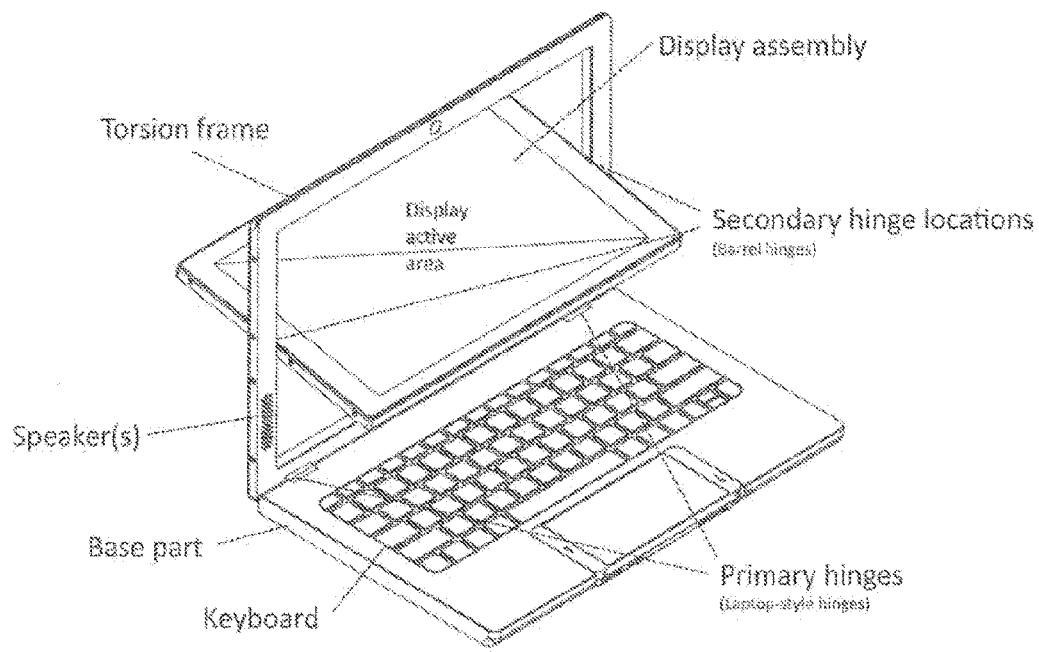
Figure 19:
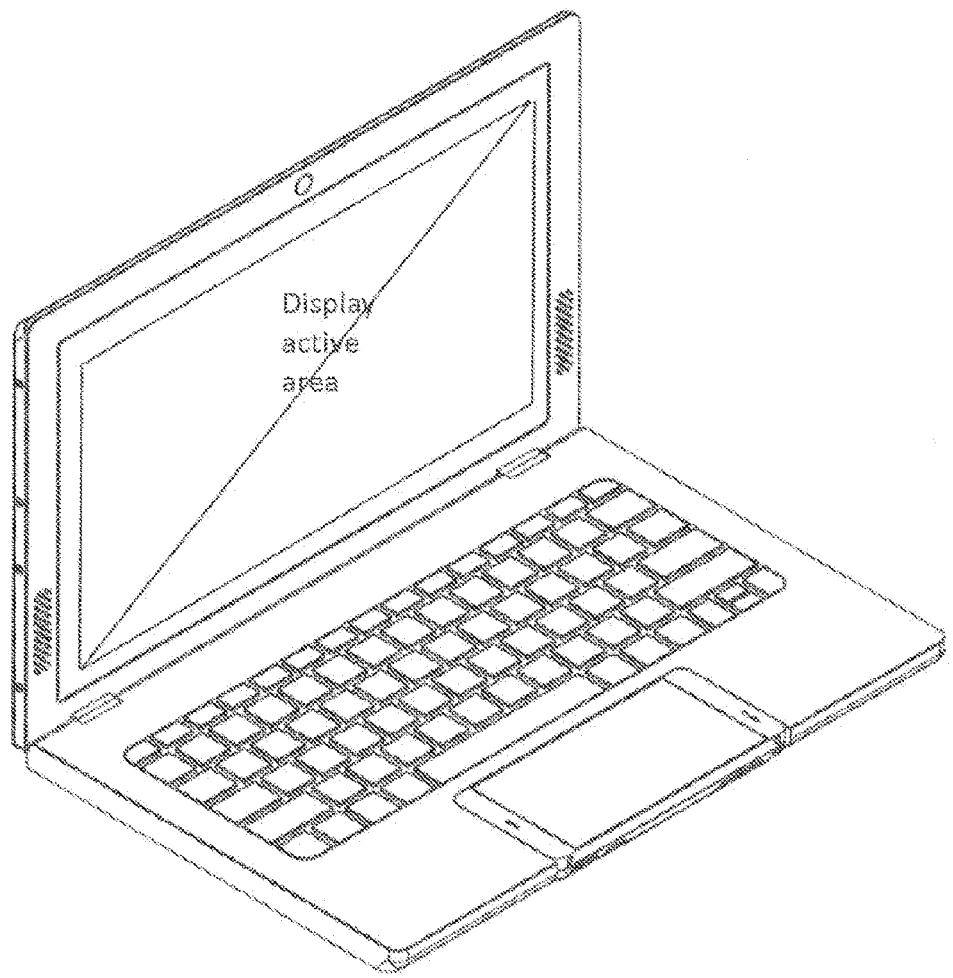
Figure 20:
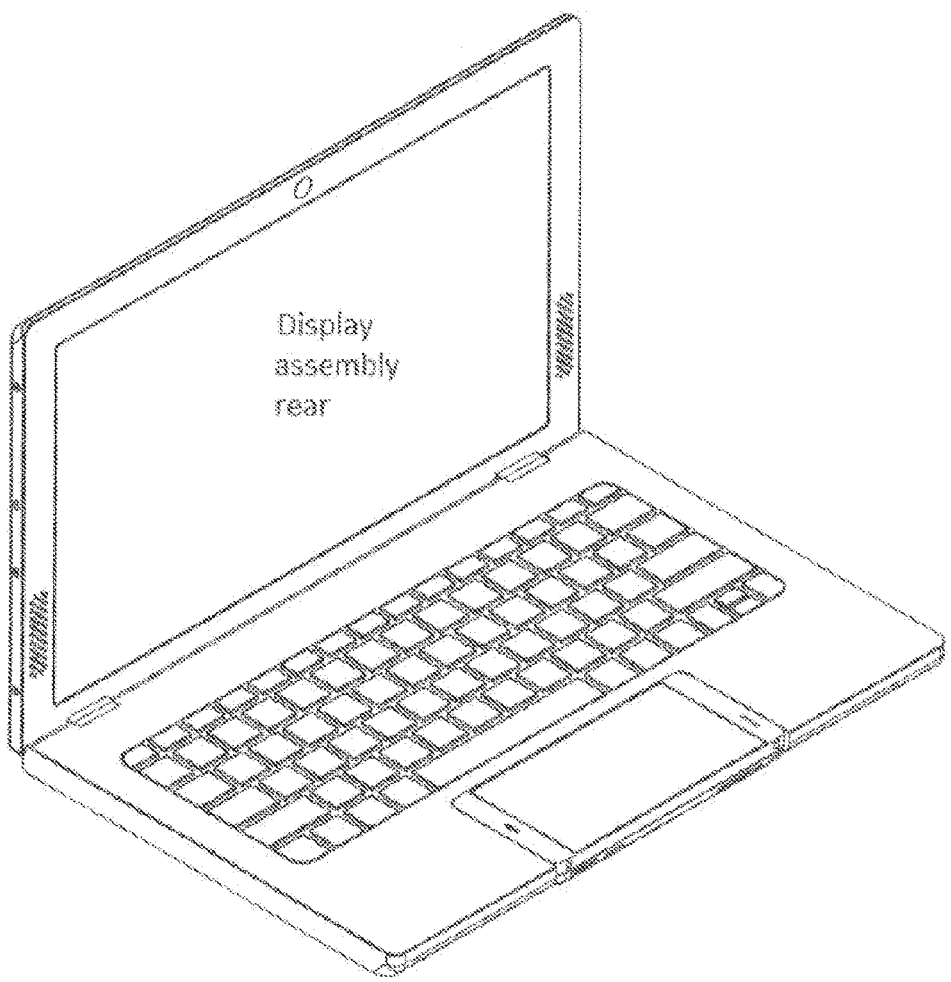

The display assembly may be pivoted by means of the secondary barrel hinges within the strength member frame to face either toward or away from a keyboard, for example, on a computing device base. (See FIG. 5, FIG. 19 and FIG. 20)

The display, strength member cover and strength member frame assembly may also be closed on top of the computing device base by means of the primary standard laptop hinges with the display panel facing either inward toward the computing device base or outward away from the computing device base.

Implementation of a display assembly (See FIG. 5) rotating on one or more central hinge(s) to allow it to work both in as a conventional clamshell computer and as a tablet computer creates a set of design problems. Current methods with reference to prior art Vadem U.S. Pat. Nos. 6,005,767 and 6,266,236 generate a number of problems. Stress are passed though the hinge barrels and into the display assembly. Methods to reduce this include the creation of a separate and complex torsional bar which are used to divert stresses away from the display, during manipulation. Further these example embodiments in prior art expose the display to impacts such as from dropping or damage through rough usage.

The invention overcomes those and other issues in part by means of torsion frame (See FIG. 6) composed of a strength member cover, a strength member frame(s), and other parts. (See FIG. 7)

Figure 6:
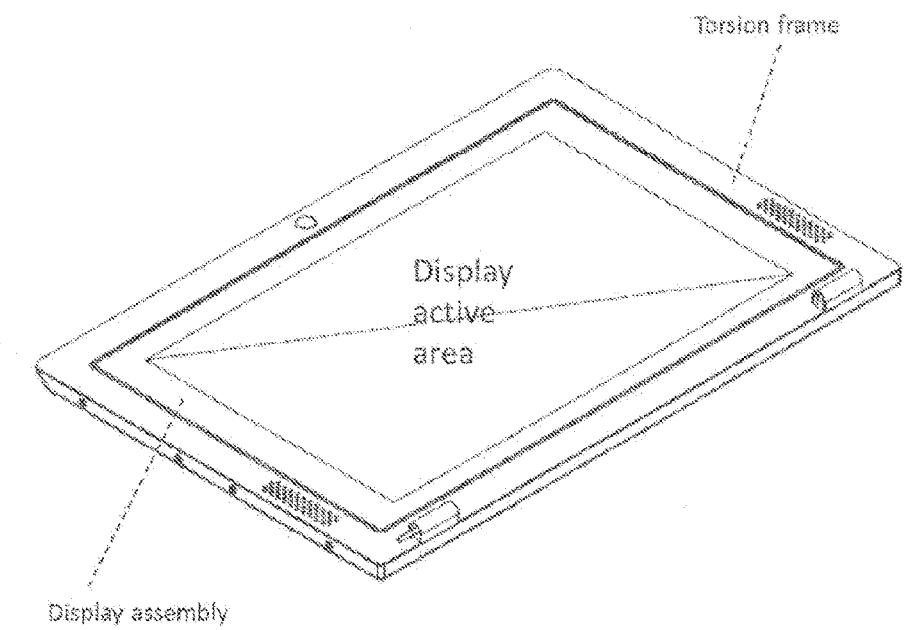
Figure 7:
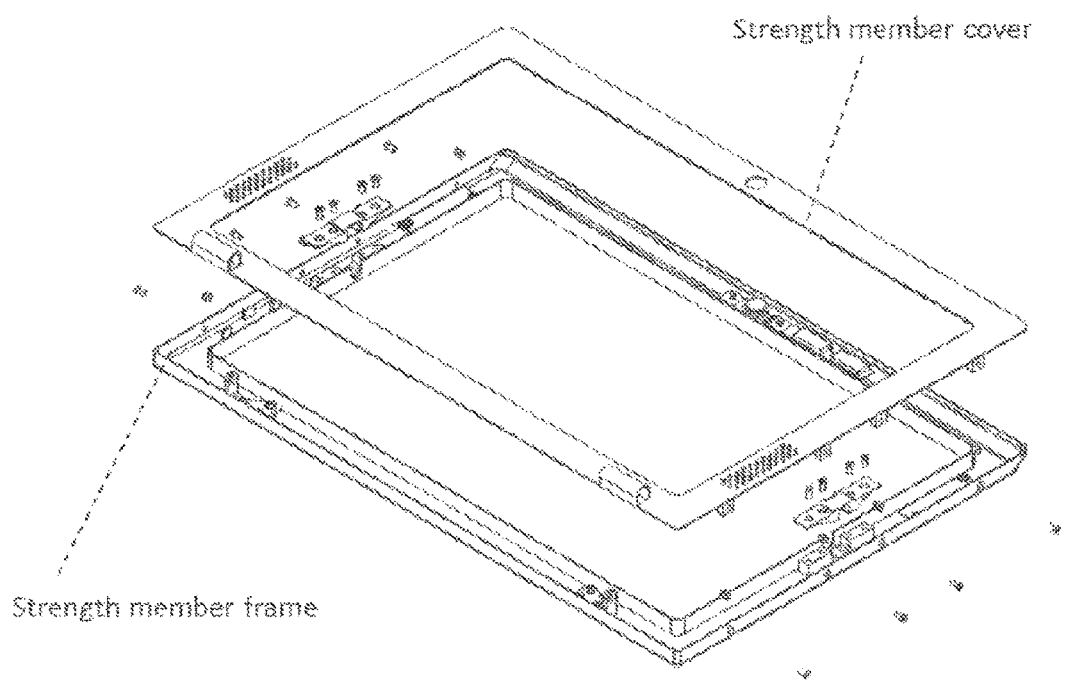

The torsion frame surrounds a display assembly (See FIG. 6).

The torsion frame and the display assembly together comprise the upper display part of a laptop- or clamshell-style computing device. (See FIG. 6)

These are assembled and mounted to a computing base through a set of industry standard laptop hinges, also referred to as the primary hinges. (See FIG. 8)

The strength member frame extends around the entire perimeter of the display assembly along its north south, east and west side faces thereby protecting the display assembly under drop conditions and from rough user usage. (See FIG. 6)

The display assembly is mounted directly into the strength member frame via a secondary hinge assembly (See FIG. 5) the components of which are referred to in this document as on the one hand as the hinge barrel (of various designs), the hinge barrel sleeve (of various designs), and the secondary hinge mount, referred to in this document as the hinge barrel mount (of various designs). (See FIG. 9) The hinge barrel and hinge barrel mount may be formed from a highly durable material such as highly carbonised steel. The hinge barrel sleeve may be formed of a moulded material such as plastic.

The strength member cover is mounted and attached to the strength member frame using conventional means such as screws, clips or other means, and acts as a cover for the internal fixtures, internal components, cable assemblies etc. (See FIG. 7)

The strength member frame and/or the strength member cover provide mounting positions for the antennas, cameras, speakers, and for other components such as buttons and switches, electronic gyroscopes, sensors, latching or locating mechanisms. (See FIG. 8) See also the later description under Component Mounting Positions.

In one embodiment, the strength member frame is formed in a C/U shape construction (See FIG. 7), but in other embodiments could be formed as an I-beam construction with potentially strength member frame covers being attached to multiple surfaces. These C/U/I or other shaped constructions are designed to provide torsional strength to the display assembly. This removes the need for separate torsion bar assemblies as the mechanical forces are distributed through either the strength member frame or the combination of the strength member frame and the strength member cover, sufficiently isolating the display assembly (including the fragile display element) from forces that could otherwise be damaging. (See FIG. 7)

The C/U/I/etc. shaped strength member frame could be designed in any orientation relative to the display part. For example, the open side of a C shaped frame could face forward, backward or toward a side.

A critical element in the implementation of a convertible computer is the design of the hinge assemblies to allow the device to work both as a conventional notebook and as a tablet computer. The hinges on typical convertible computer designs are complex and require both complex assembly and manufacturing processes. The current invention allows the use of industry standard hinges laptop-style hinges, the primary hinges, for the attachment of the display assembly and strength member frame to the computing base and provides a simple and robust method to allow for display manipulation from a conventional notebook configuration to a tablet configuration, through the use of a pair of simple barrel hinges, or secondary hinges.

Figure 23:
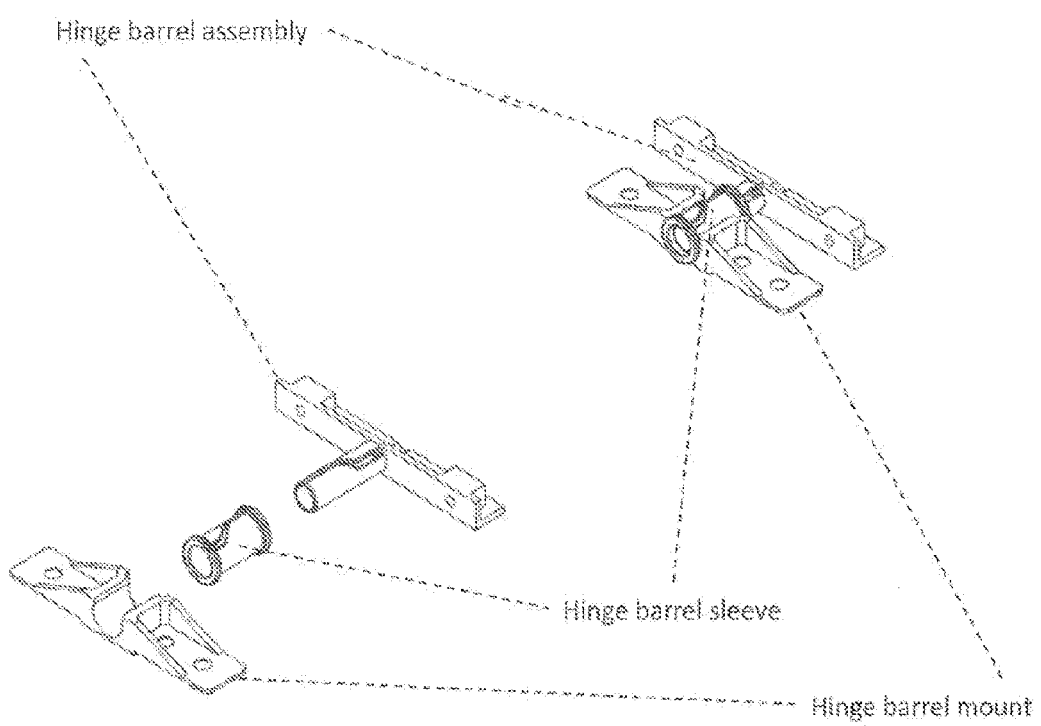

In a specific embodiment, the secondary hinge is formed as a three piece assembly, consisting of a hinge barrel, a barrel hinge sleeve and a hinge barrel support. (See FIG. 9 and FIG. 23) The hinge barrels are secured to the display rear case using conventional techniques including but limited using screws and pinning methods to distribute the attachment and other mechanical forces into the display rear cover. Both the hinge barrels may have a hole and or slot in them to allow for the cable assemblies required to pass through from the strength member frame. (See FIG. 9)

Figure 10:
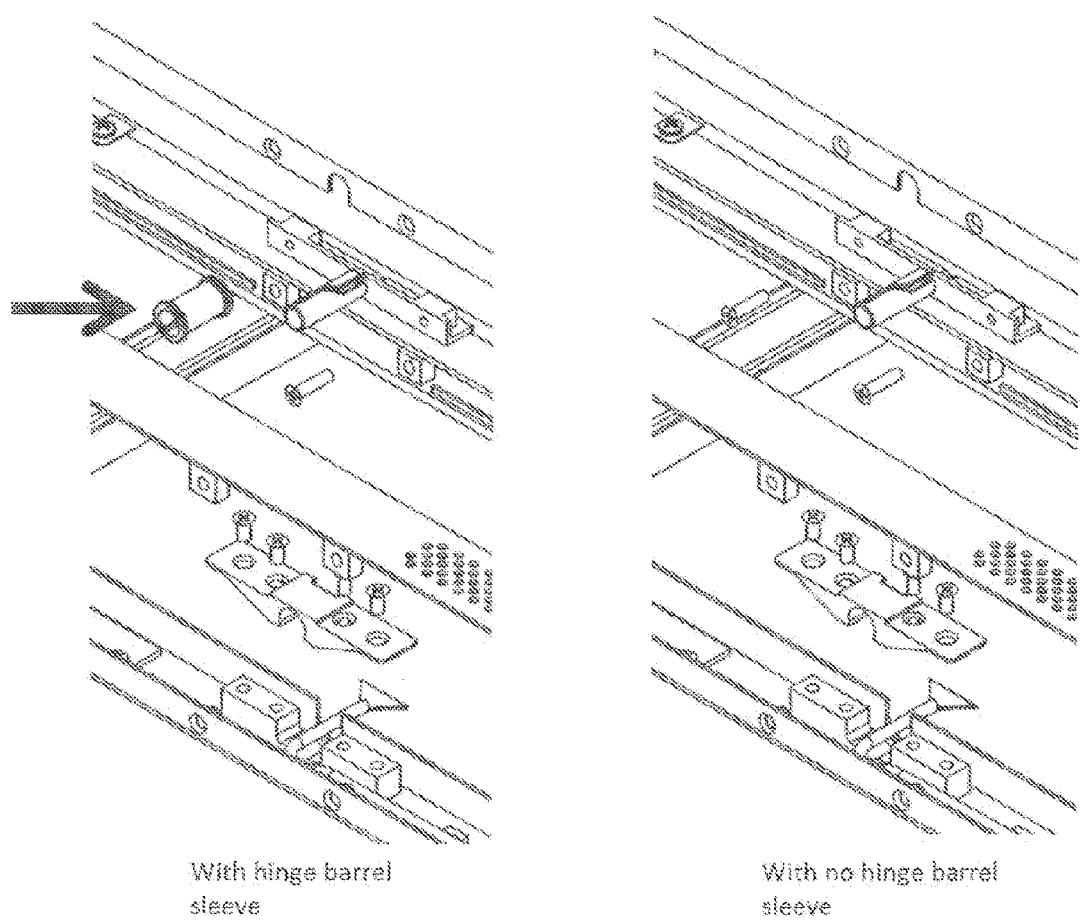

The hinge barrel sleeve is placed over the hinge barrel shaft and is used to provide both a rotating surface between the barrel hinge and the hinge barrel mounting assembly. (See FIG. 10)

Figure 24:
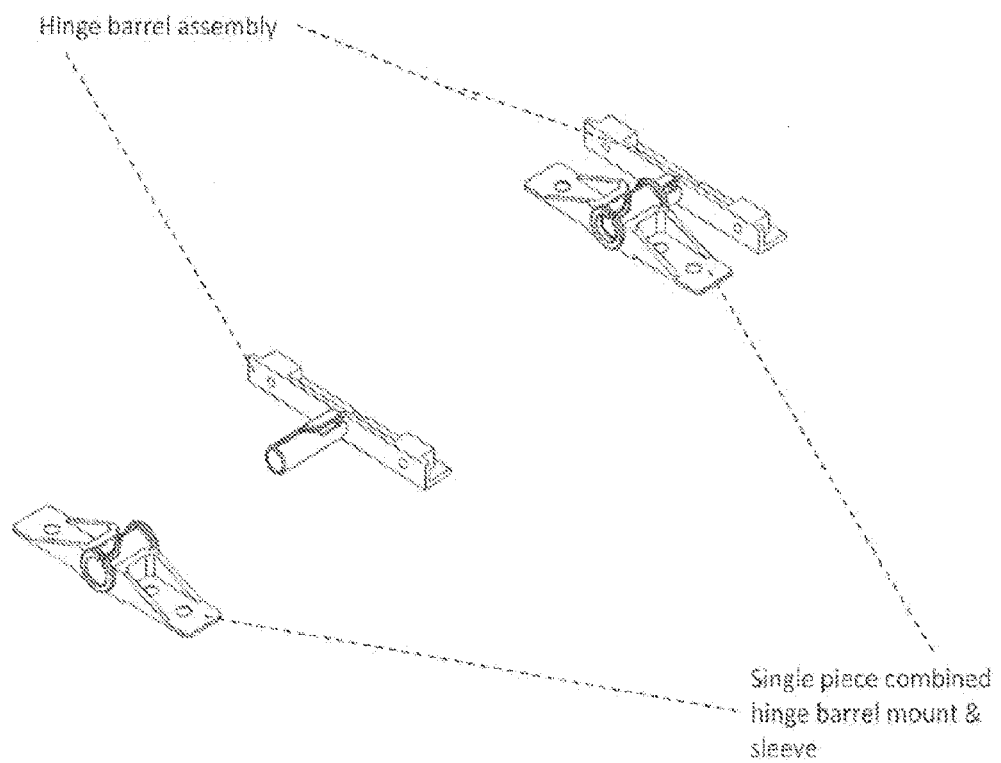
Figure 25:
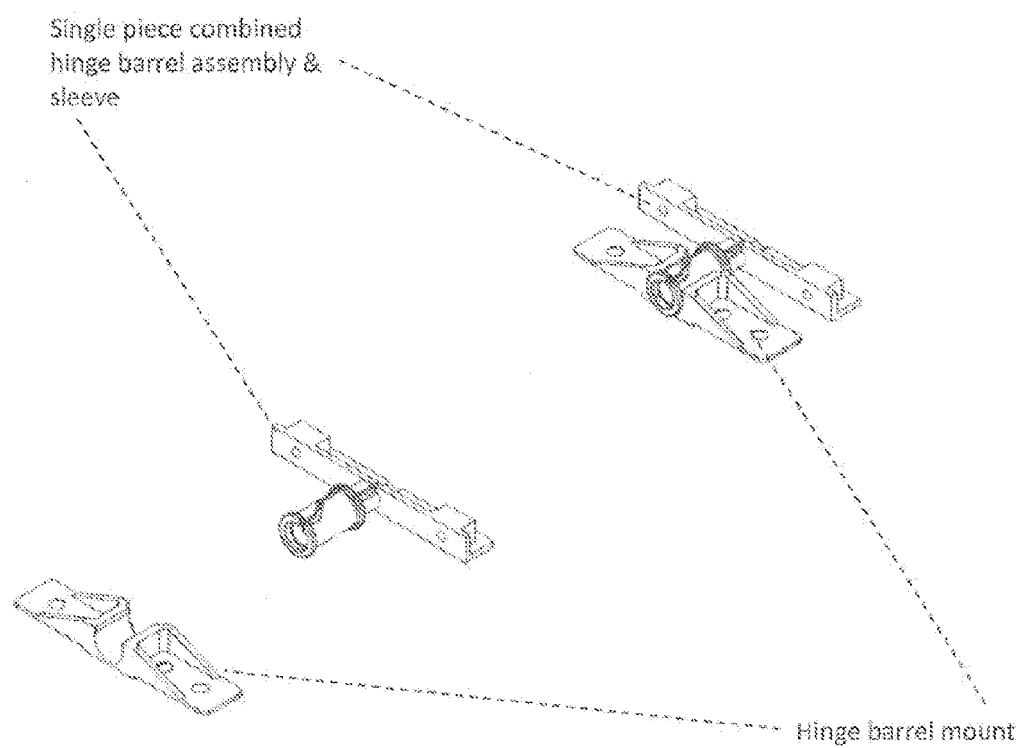

Alternatively, the hinge barrel sleeve may not be a separate part but may instead be inherent in the shape of either the hinge barrel or hinge barrel support design. (See FIG. 24 and FIG. 25)

The diameter and choice of material of the hinge barrel sleeve will determine the friction of the hinge assembly allowing common hinge barrels and hinge barrel mounting designs across a plurality of design and device models to be created with the hinge sleeve providing the differences in friction required for different devices.

The hinge barrel support is secured into the strength member frame using conventional techniques including but limited using screws and pinning methods to distribute attachment and other mechanical forces into the strength member frame. (See FIG. 9)

Figure 11:
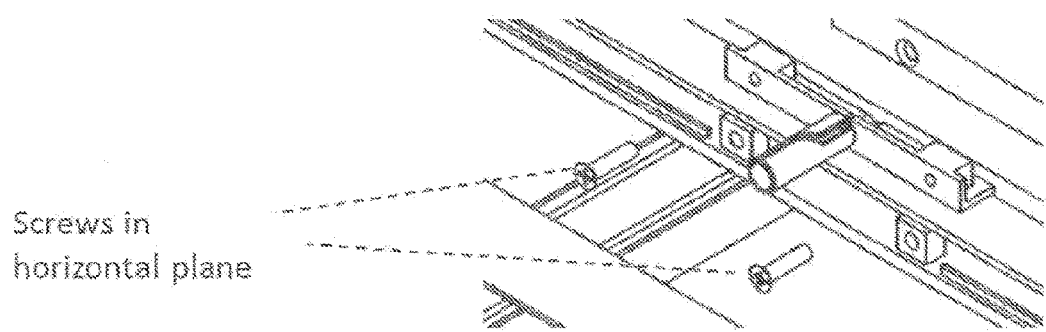

In a specific embodiment, the screws that are used to secure the hinge barrel are inserted in a horizontal plane to the strength member frame and the display rear cover to reduce the effects that the rotating of the display will have on loosening the screws and to provide additional mechanical strength to the assembly as the rotating forces will act in a manner perpendicular to the screw cross section. (See FIG. 11) Thus the strength of the attachment (in which direction the forces are acting) is governed by the screw diameter and its material proprieties and not by the pitch of the screw thread.

Alternatively, screws or other fixation methods could be employed in vertical or other implementations.

Figure 12:
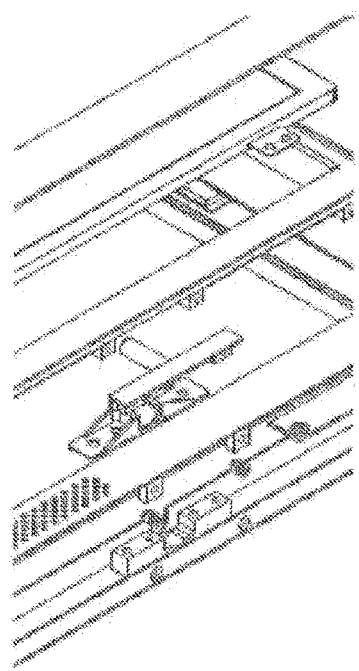

This configuration could also be reversed whereby the hinge barrel is secured into the strength member frame and the hinge barrel support is mounted in the display assembly. (See FIG. 12) The hinge barrel support could also be moulded into the strength member frame, or into the display assembly.

During assembly of the strength member frame to the display assembly, the hinge barrel and the hinge barrel support are connected. (See FIG. 9 and FIG. 23) The barrel hinge support may be designed such that the barrel hinge is fully enclosed or it may be designed in a "C" shape allowing the barrel hinge and barrel hinge sleeve to be press "snap" fit assembled into it. (Not shown).

This simple method provides a robust, easy to assemble and low cost solution to enable display rotation in devices.

Component Mounting Positions

Products covered by this invention will be multi modal in nature moving from one user interaction method such as in a conventional notebook computer configuration to another such as when the device is used a tablet computer. This requires the user have access to buttons and to system features in a variety of different usage scenarios. The invention utilises the strength member frame and or the strength member frame cover to provide component mounting of various user and system required elements. (See FIG. 8)

A strength member frame can be used in various embodiments to mount buttons, switches, camera(s), antennas, speakers and other components such as latching mechanisms, locating mechanisms and electronic components such as gyroscopes and other sensors. The strength member cover(s) can also provide support for elements such as the camera lenses, and also acts as a cosmetic cover for these components and a printing surface to facilitate better user interaction with the device. (See FIG. 8)

Unibody Construction

The various mechanical components are assembled in such a way as to work as a unibody system when stressed, for example during physical manipulation of a rotating display from one position to another.

Consumers require thinner and more portable products. This requirement drives innovations in mechanical construction and requires the mechanical engineer to maximise material properties and provide innovative design techniques. In one embodiment, a mechanical architecture in which the mounting system and construction of the system are configured to ensure that the individual components of a system work as a unibody system when stressed is used. The design of a convertible system architecture creates specific problems due to the forces required to manipulate the display through a number of different axis and via a number of different fulcrum points.

The display assembly is formed from a display rear case, a display element, hinge barrels, and a display support surround frame, and various other elements. (See FIG. 13)

The display element is secured to the display support surround frame, the hinge barrels are also mounted to the display support surround frame, and a display rear cover is placed over the display element and the hinge barrels. The assembly including the hinge barrels are secured using screws (or other means). (See FIG. 13)

In a specific embodiment, the screws are mounted in a horizontal plane through the display rear case. This configuration maximizes engagement and allows the surrounding display support frame and the display rear cover assembly be very thin whilst having good mechanical properties. This configuration also joins the display assembly components together. The display assembly is further secured using screws (or other means) along its edges. (See FIG. 13)

Alternatively, screws or other fixation methods could be employed in vertical or other implementations.

The hinge barrels may be located and secured in to the display assembly on pins to provide further location and bonding between the system elements. This configuration allows the assembly to stress as a unibody when rotated.

A further example of unibody construction is the strength member frame and the strength member frame cover, together forming the torsion frame assembly. (See FIG. 6 and FIG. 7)

Figure 14:
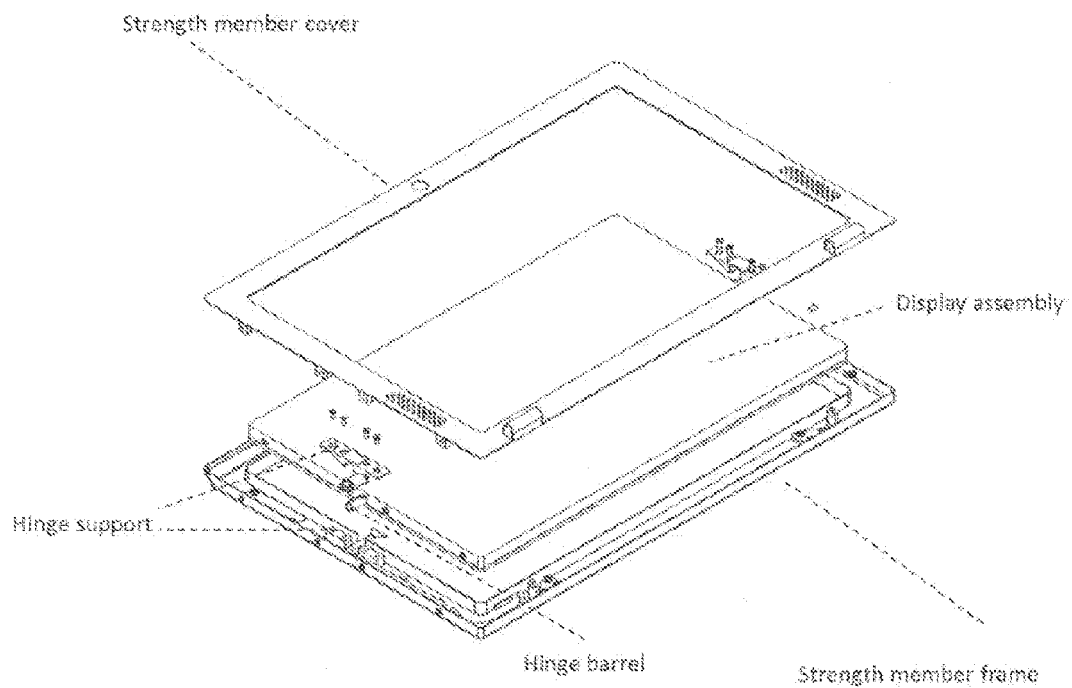

The display assembly is inserted into the torsion frame assembly, including its strength member frame and optional strength member cover by locating the hinge barrels into hinge barrel support, all together forming the upper display part of the clamshell. (See FIG. 14)

The strength member frame cover is then secured to the strength member frame by means of horizontally placed screws (or by other means). These securing screws are mounted horizontally to ensure that forces acting upon the strength member frame and strength member frame cover assembly are transferred through the screw cross section and not along its thread. (See FIG. 6, FIG. 7, FIG. 14 and FIG. 15)

Alternatively, screws or other fixation methods could be employed in vertical or other implementations.

The strength member frame and the strength member frame cover assembly transfer mechanical forces away from the display assembly, when the assembly is manipulated.

A further benefit of this configuration is that it allows the display assembly and the strength member frame and the strength member frame cover assembly be very thin whilst having good mechanical properties.

Cable Routing

The strength member cover, strength member frame and hinges also provide for means of cable routing.

Cable routing options are flexible in order to accommodate many possible embodiments of signal and power cable routing, as well auxiliary component (e.g., speaker, camera, sensor) positioning within the strength member cover, strength member frame or on/within any other element of the display part assembly.

Signal and power cables may be routed through separate hinges, both between the base assembly and display assembly, and between the strength member frame assembly and the strength member cover assembly.

The cables for the display and for the components located in the display assembly and or the strength member frame are routed through the primary hinges and into the strength member frame some of which then pass through the centre bore a of the barrel hinge into the display. (See FIG. 8)

In one embodiment of the invention cabling for the display assembly the antennas cameras and other components mounted in the strength member frame is routed through one or the other primary hinges or may be split between the two primary hinges that attach the strength member frame to the computing base. Cables are routed through the barrel hinge bores using various methods which minimize circular diameter through the bores and flat thickness on each side of the bores.

In various embodiments the cabling required for the display may be split between the left and right hand barrel hinges such as to minimise the size of the barrel hinge and its bore, both increasing strength and also reducing the size of the barrel hinge. This facilitates the design of the thinnest overall device. The selection of cables to be routed to each bore can minimize electronic interference between cables and simplify the electronic design of the device.

In a specific embodiment, two cables are split out from the base of the computing device, in this embodiment, the touch panel, antenna and camera wiring are taken through the left hinge and the display data cable taken though the right hand side hinge. Other cables are routed to components mounted in the strength member frame. Various embodiments of barrel hinge are possible that allow for pre and post assembly of the cable assemblies before they are routed through the barrel hinge.

The wires and cable assembles are routed through a fixed path which may be moulded into the strength member frame to attach to the various devices such as the camera.

Figure 16:
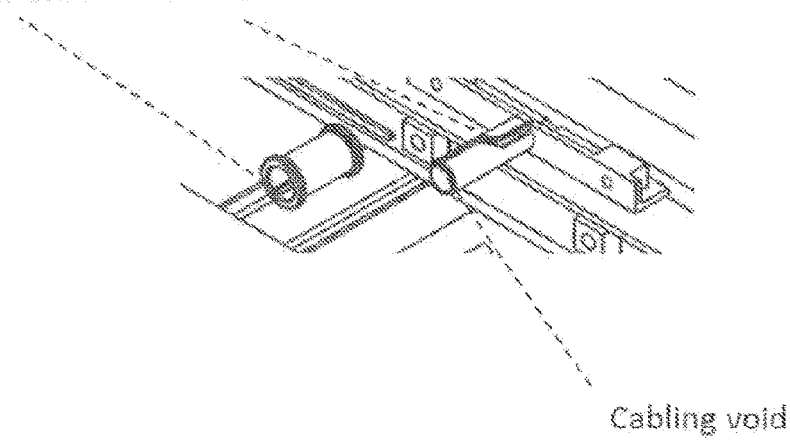

The cable assembly for the display assembly is formed in a circular arrangement and passes though the barrel hinge (See FIG. 16) and is then which is rolled flat upon exit from the hinge barrel and passed under the display, for example. This configuration minimises the thickness of the display assembly, allowing for the design of an overall thinner device and also improves reliability as it allows the cable to be located centrally within the barrel hinge, preventing the cable assembly twisting, when the display is rotated.

Hinge bore designs may be such that cables may be inserted pre-assembled during manufacture, rather than inserted and then assembled (e.g., by adding a connector or connectors), as with the prior art. For example, the barrel hinge design may include, but is not required to have, a shaped channel to allow cables to be placed through the hinge bore pre-assembled.

The optional hinge barrel sleeve in the secondary hinge assembly may, but is not required to, provide additional strength to the secondary hinge and may include another shaped channel for cable insertion that is then moved out of alignment with the shaped channel on the barrel hinge, thus guarding against the cable slipping out of the secondary hinge assembly. (See FIG. 16)

Locating the Rotating Display Assembly

Locating of the display during rotation and protection against over-rotation is provided for by means of several possible methods. Locating the display during rotation and in locked positions is very important, as is protection against over-rotation. Locating the display in locked positions provides for more secure and comfortable use by the consumer. Over-rotation would add stress to the display cable and may prevent the correct alignment of the display assembly within the frame.

Either the strength member frame or strength member cover may provide for mounting locations for securing of the display in a conventional laptop-style configuration, a tablet-style configuration, or any other pre-determined or optionally user selectable configuration.

Locating may be by means of spring assemblies, magnets, pins, friction fit or other methods. One or more locating method may be used concurrently in a given embodiment.

Figure 17:
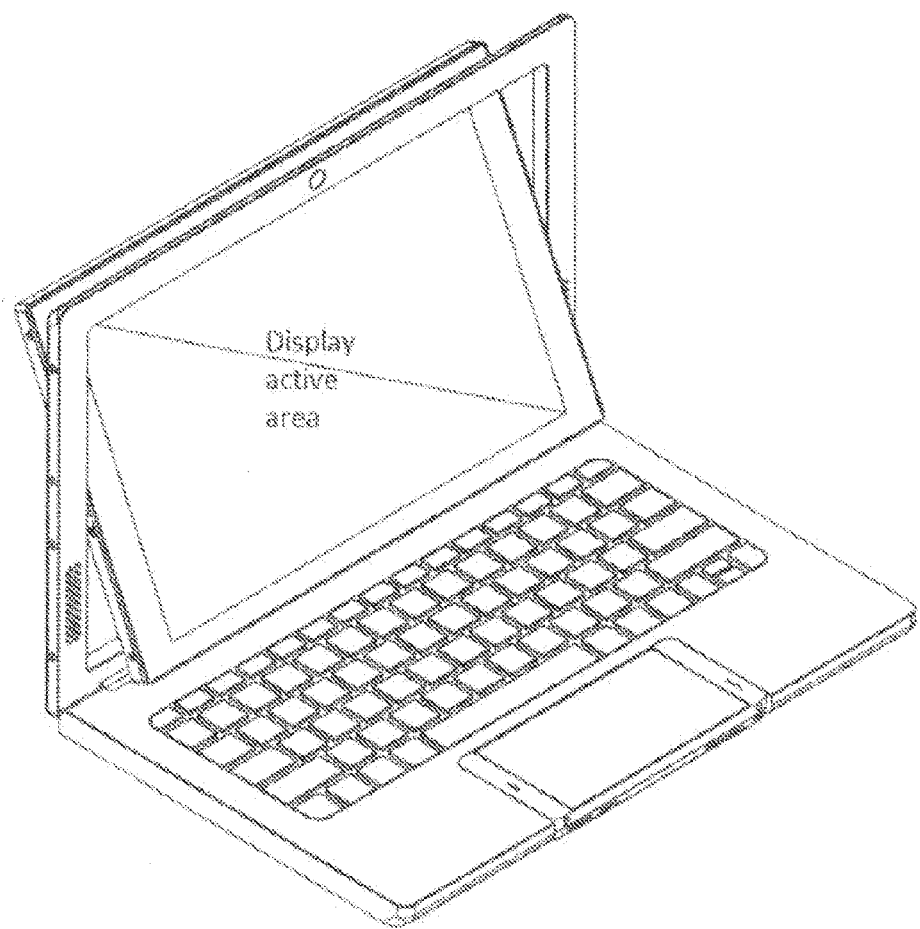
Figure 18:
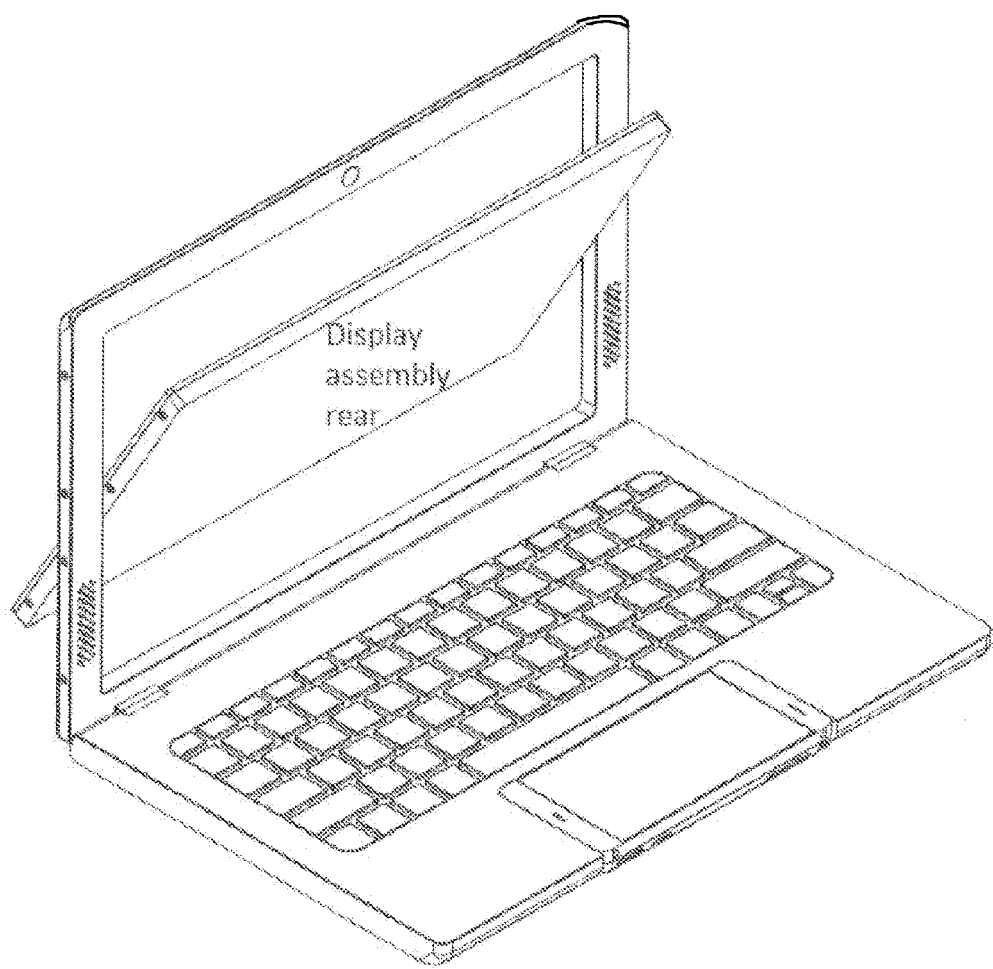

The display assembly may rotate freely between or among various locating positions. (See FIG. 17 and FIG. 18)

Figure 1:
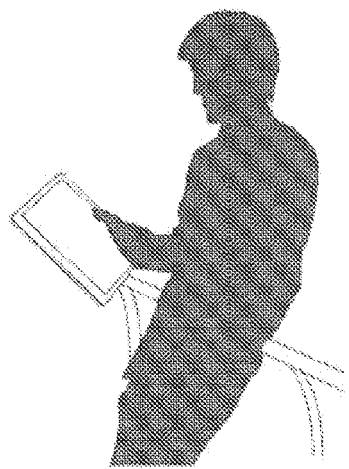
FIG. 1 Tablet-style usage model (1)
FIG. 2 Tablet-style usage model (2)
FIG. 3 Media-viewing- or presentation-style usage model (1)
FIG. 4 Media-viewing- or presentation-style usage model (2)
FIG. 5 Convertible computer
FIG. 6 Clamshell display part
FIG. 7 Strength member frame and cover
FIG. 8 Torsion frame mounted to base part
FIG. 9 Secondary hinge assembly
FIG. 10 Hinge barrel sleeve options
FIG. 11 Secondary hinge barrel mounting
FIG. 12 Hinge barrel support mounted to display assembly
FIG. 13 Display assembly detail
FIG. 14 Clamshell display part detail
FIG. 15 Display assembly and torsion frame assembly
FIG. 16 Secondary hinge cable routing
FIG. 17 Display rotating (1)
FIG. 18 Display rotating (2)
FIG. 19 Display rotated to traditional laptop position
FIG. 20 Display rotated away from keyboard (1)
FIG. 21 Display rotated away from keyboard (2)
FIG. 22 Display rotated away from keyboard—Presentation mode
FIG. 23 Three part secondary hinge example
FIG. 24 Two part secondary hinge example (1)
FIG. 25 Two part secondary hinge example (2)
Figure 2:
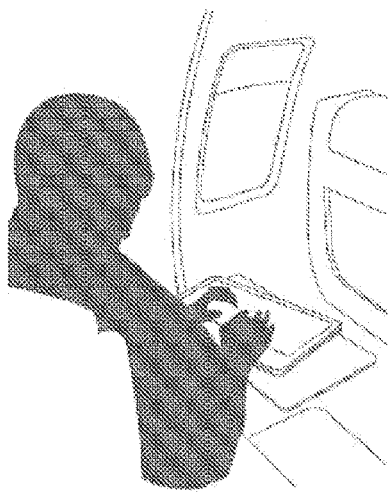
Figure 3:
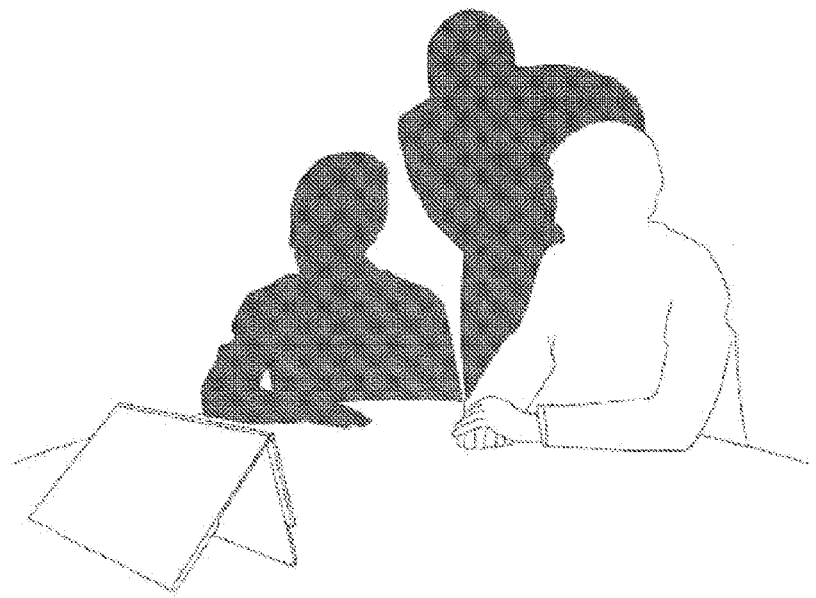
Figure 4:
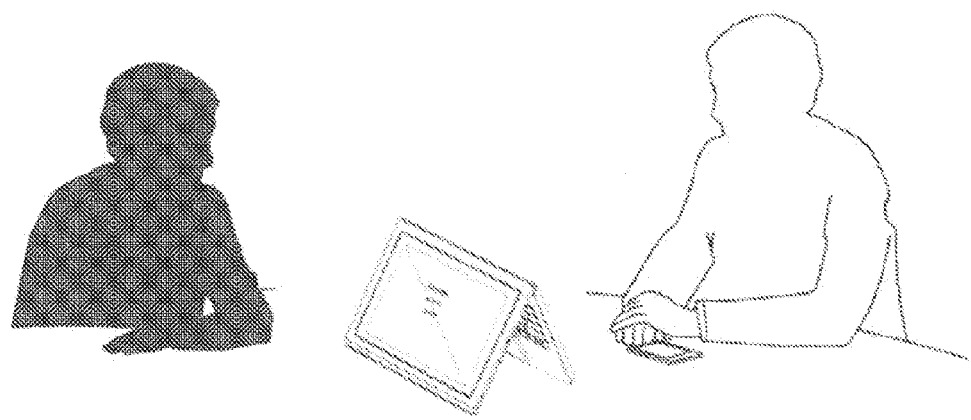

In various embodiments, the strength member frame and or the strength member cover provides mounting locations for the securing of the display in both a conventional laptop configuration (See FIG. 19) and for location in tablet configuration. (See FIG. 1)

This can be achieved through the location of and or placement moulding details within the display assembly and in the strength member frame and or strength member frame cover such or by spring pins assemblies, magnets, or friction fit (between display assembly and strength member frame and or strength member frame cover. In various embodiments, one or more of the solutions are used. For example, magnets may be located in the surrounding frame and display assembly. As the display is rotated, the magnet pulls and aligns the display assembly and acts as a retaining or locking solution.

In other embodiments, the barrel hinge sleeve may have protrusions or indentations (not shown) that interact with details in the hinge barrel or hinge barrel mount to secure and locate the display assembly in various orientations.

Figure 21:
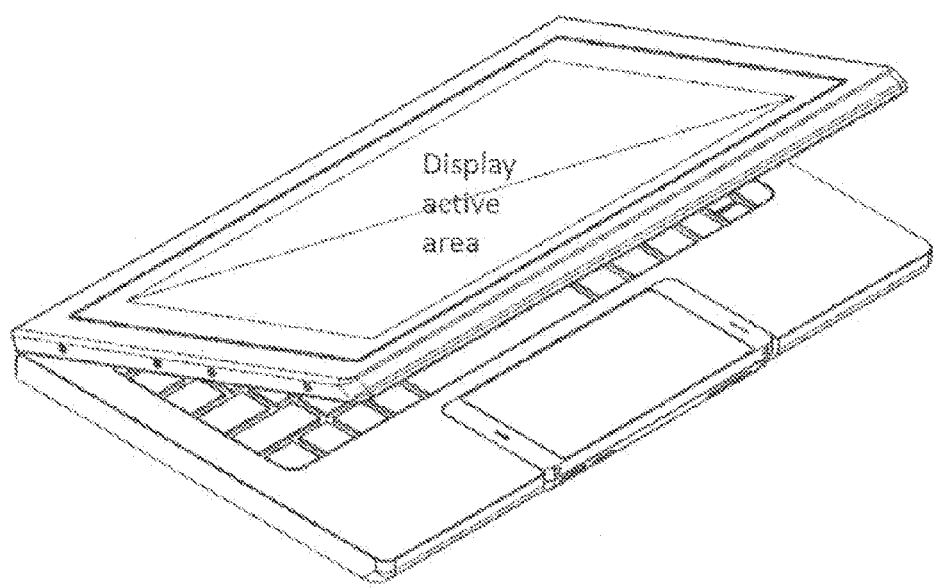
Figure 22:
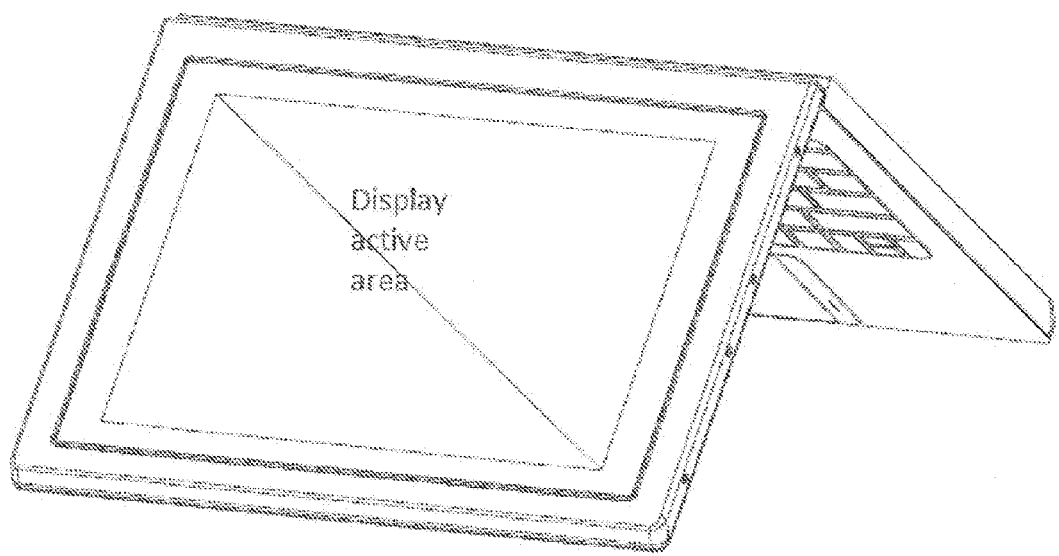

In addition to laptop- and tablet-style configurations, the primary hinges may also be used in conjunction with the secondary hinges to enable additional usage positions, such as for media viewing (See FIG. 21) or for presentations (See FIG. 22).

What is claimed is:

1. A device for providing a pivotable display assembly for an electronic device comprising:
    a display assembly comprising:
        a display rear case; and
        a display element, wherein the display rear case is coupled to the display element;
    a torsion frame assembly, wherein the torsion frame assembly completely surrounds the display assembly;
    a secondary hinge assembly comprising:
        a hinge barrel, wherein the hinge barrel is coupled to the display rear case;
        a barrel hinge sleeve, wherein the barrel hinge sleeve covers a hinge barrel shaft to provide a rotating surface between the hinge barrel and a hinge barrel mounting assembly, wherein a diameter of the hinge barrel sleeve is based, at least in part, on a predetermined friction between the hinge barrel and the barrel hinge sleeve; and
        a hinge barrel mount, wherein the hinge barrel is coupled to the hinge barrel mount;
    a strength member frame of the torsion frame assembly, wherein the strength member frame extends around a perimeter of the display assembly, wherein the display assembly is mounted directly into the strength member frame via the secondary hinge assembly, and wherein the hinge barrel mount is coupled to the strength member frame;
    a strength member cover, wherein the strength member cover is coupled to the strength member frame via one or more horizontally placed securing screws so that one or more forces acting upon the strength member frame and the strength member cover are transferred through a cross section of the securing screws and not along a thread of the securing screws, and wherein the strength member frame and the strength member cover transfer mechanical forces away from the display assembly, wherein the display assembly is subjected to the mechanical forces during manipulation of the display assembly; and
    a camera lens supported by the strength member frame.

2. The device of claim 1, wherein the display element is rectangular, wherein the strength member frame is a rigid rectangular frame that surrounds all four sides of the display assembly, wherein all sides of the rigid rectangular frame isolate the display assembly from stress, torsional forces, impact forces, and over-rotation.

3. The device of claim 1, wherein the strength member cover covers one or more internal components of the display assembly.

4. The device of claim 1, wherein the barrel hinge sleeve is operable to adjust rotation resistance of the display assembly.

5. The device claim 1, wherein the display assembly via the secondary hinge assembly is rotatable so as to face toward a base of the electronic device in one position and to face away from the base of the electronic device in second position.

6. The device of claim 1, where the display assembly is operable to close over the top of a base of the electronic device so as to form a tablet computer-style form factor.

7. The device of claim 6, wherein the display assembly is operable to close via a set of primary hinges connecting the display assembly and the base and the secondary hinge assembly.

8. The device of claim 1, wherein the display assembly is configured to form a unibody-type construction with the display element secured to a display support frame which is secured to a display rear case formed of a rigid material.

9. The device of claim 1, wherein the display assembly is secured at orientations facing a base of the electronic device or facing opposite the base of the electronic device within the strength member frame using one or more of a spring assembly, a magnet, a friction fit, and a pin.

10. The device of claim 1, wherein the hinge barrel is a "C" shape to allow the hinge barrel and the barrel hinge sleeve to snap fit into the display assembly.

11. A device for providing a pivotable display assembly for an electronic device comprising:
    a display assembly comprising:
        a display rear case; and
        a display element, wherein the display rear case is coupled to the display element;
    a torsion frame assembly, wherein the torsion frame assembly completely surrounds the display assembly;
    a secondary hinge assembly comprising:
        a hinge barrel, wherein the hinge barrel is coupled to the display rear case;
        a barrel hinge sleeve, wherein the barrel hinge sleeve covers a hinge barrel shaft to provide a rotating surface between the hinge barrel and a hinge barrel mounting assembly; and
        a hinge barrel support, wherein the hinge barrel is coupled to the hinge barrel support;
    a strength member frame of the torsion frame assembly, wherein the strength member frame extends around a perimeter of the display assembly, wherein the hinge barrel is secured into the strength member frame, and wherein the hinge barrel support is mounted in the display assembly;

a strength member cover, wherein the strength member cover is coupled to the strength member frame via one or more horizontally placed securing screws so that one or more forces acting upon the strength member frame and the strength member cover are transferred through a cross section of the securing screws and not along a thread of the securing screws, and wherein the strength member frame and the strength member cover transfer mechanical forces away from the display assembly, wherein the display assembly is subjected to the mechanical forces during manipulation of the display assembly; and a camera lens supported by the strength member cover.

12. The device of claim 11, wherein the display element is rectangular, wherein the strength member frame is a rigid rectangular frame that surrounds all four sides of the display assembly, wherein all sides of the rigid rectangular frame isolate the display assembly from stress, torsional forces, impact forces, and over-rotation.

13. The device of claim 11, wherein the strength member cover covers one or more internal components of the display assembly.

14. The device of claim 11, wherein the barrel hinge sleeve is operable to adjust rotation resistance of the display assembly.

15. The device claim 11, wherein the display assembly via the secondary hinge assembly is rotatable so as to face toward a base of the electronic device in one position and to face away from the base of the electronic device in second position.

16. The device of claim 11, where the display assembly is operable to close over the top of a base of the electronic device so as to form a tablet computer-style form factor.

17. The device of claim 16, wherein the display assembly is operable to close via a set of primary hinges connecting the display assembly and the base and the secondary hinge assembly.

18. The device of claim 11, wherein the display assembly is configured to form a unibody-type construction with the display element secured to a display support frame which is secured to a display rear case formed of a rigid material.

19. The device of claim 11, wherein the display assembly is secured at orientations facing a base of the electronic device or facing opposite the base of the electronic device within the strength member frame using one or more of a spring assembly, a magnet, a friction fit, and a pin.

20. The device of claim 11, wherein the hinge barrel is a "C" shape to allow the hinge barrel and the barrel hinge sleeve to snap fit into the display assembly.

* * * * *